United States Patent
Zhang

(10) Patent No.: US 12,079,424 B2
(45) Date of Patent: Sep. 3, 2024

(54) METHOD FOR DETECTING ACTIVE PEN TOUCH POSITION, AND ELECTRONIC TERMINAL

(71) Applicant: HUAWEI TECHNOLOGIES CO., LTD., Guangdong (CN)

(72) Inventor: Junyong Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/910,565

(22) PCT Filed: Mar. 2, 2021

(86) PCT No.: PCT/CN2021/078696
§ 371 (c)(1),
(2) Date: Sep. 9, 2022

(87) PCT Pub. No.: WO2021/179960
PCT Pub. Date: Sep. 16, 2021

(65) Prior Publication Data
US 2023/0133783 A1    May 4, 2023

(30) Foreign Application Priority Data
Mar. 10, 2020   (CN) .......................... 202010163208.0

(51) Int. Cl.
*G06F 3/041*    (2006.01)
*G06F 3/0354*   (2013.01)
(Continued)

(52) U.S. Cl.
CPC ...... *G06F 3/041661* (2019.05); *G06F 3/0441* (2019.05); *G06F 3/0442* (2019.05); *G06F 3/03545* (2013.01); *G06F 3/0383* (2013.01)

(58) Field of Classification Search
None
See application file for complete search history.

(56) References Cited

U.S. PATENT DOCUMENTS

2006/0012581 A1   1/2006   Haim et al.
2013/0016046 A1*  1/2013   Chou ................... G06F 1/3262
                                                      345/173
(Continued)

FOREIGN PATENT DOCUMENTS

CN    102880332 A    1/2013
CN    103257740 A    8/2013
(Continued)

*Primary Examiner* — Kirk W Hermann
(74) *Attorney, Agent, or Firm* — HUAWEI TECHNOLOGIES CO., LTD.

(57) ABSTRACT

When a touch position of an active pen on a screen of an electronic terminal is detected, and once a first touch position of the active pen on the screen of the electronic terminal is detected based on downlink signals collected by sensors under the screen of the electronic terminal, sensors outside a first preset region including the first touch position are disabled, where sensors in the first preset region are still in a working mode. In addition, a quantity of sensors in the first preset region is less than a quantity of sensors under the screen of the electronic terminal. In this way, when a second touch position of the active pen on the screen of the electronic terminal is subsequently determined, downlink signals sent by the active pen are collected only by using the sensors in the first preset region, instead of always by using all sensors under the screen of the electronic terminal, so that detection flexibility is improved.

16 Claims, 12 Drawing Sheets

(51) Int. Cl.
*G06F 3/038* (2013.01)
*G06F 3/044* (2006.01)

(56) References Cited

U.S. PATENT DOCUMENTS

| | | | | |
|---|---|---|---|---|
| 2013/0027323 A1* | 1/2013 | Chang | G06F 1/3203 | |
| | | | 345/173 | |
| 2013/0106716 A1* | 5/2013 | Sundara-Rajan | G06F 3/0443 | |
| | | | 345/173 | |
| 2013/0181941 A1* | 7/2013 | Okuno | G06F 3/038 | |
| | | | 345/173 | |
| 2013/0215049 A1* | 8/2013 | Lee | G06F 3/041 | |
| | | | 345/173 | |
| 2017/0147141 A1* | 5/2017 | Khazeni | G06F 3/041662 | |
| 2017/0371485 A1 | 12/2017 | Ohi | | |
| 2018/0004324 A1* | 1/2018 | Park | G06F 3/0441 | |
| 2018/0074619 A1* | 3/2018 | Chandran | G06F 3/04162 | |
| 2018/0113523 A1* | 4/2018 | Hara | G06F 3/0446 | |
| 2018/0314377 A1 | 11/2018 | Debates | | |
| 2019/0171320 A1* | 6/2019 | Kim | G06F 3/04184 | |

FOREIGN PATENT DOCUMENTS

| | | |
|---|---|---|
| CN | 107944361 A | 4/2018 |
| CN | 108255333 A | 7/2018 |
| CN | 109416594 A | 3/2019 |
| CN | 109740430 A | 5/2019 |
| CN | 110007784 A | 7/2019 |
| CN | 110032288 A | 7/2019 |
| CN | 110109565 A | 8/2019 |

* cited by examiner

METHOD FOR DETECTING ACTIVE PEN TOUCH POSITION, AND ELECTRONIC TERMINAL

This application is a national stage of International Application No. PCT/CN2021/078696, filed on Mar. 2, 2021, which claims priority to Chinese Patent Application No. 202010163208.0, filed on Mar. 10, 2020. Both of the aforementioned applications are hereby incorporated by reference in their entireties.

TECHNICAL FIELD

This application relates to the field of terminal technologies, and in particular, to a method for detecting an active pen touch position, and an electronic terminal.

BACKGROUND

As a size of a terminal screen continuously increases, to make touch more accurate, a touch operation may be performed on the terminal screen by using an active pen. Especially in some writing or drawing scenarios, touch accuracy can be improved, and further, a user can have more real experience, just like writing or drawing on paper.

In a process in which a user writes or draws on a terminal screen by using an active pen, the terminal needs to continuously detect a touch position of the active pen on the terminal screen. In a conventional technology, when a touch position of an active pen on a terminal screen is detected, all sensors under the terminal screen are first enabled, downlink signals sent by the active pen are collected by using each sensor, and then the touch position of the active pen on the terminal screen is determined based on the downlink signals collected by each sensor. In addition, when subsequently a touch position of the active pen on the terminal screen continues to be detected, downlink signals sent by the active pen are collected still by using each sensor, and the touch position of the active pen on the terminal screen is determined based on the downlink signals collected by each sensor. This detection manner is fixed and has low flexibility.

SUMMARY

According to a method for detecting an active pen touch position and an electronic terminal that are provided in embodiments of this application, when a touch position of an active pen on a terminal screen is detected, detection flexibility is improved.

According to a first aspect, an embodiment of this application provides a method for detecting an active pen touch position, and the method is executed by an electronic terminal, where the method for detecting an active pen touch position may include:
   determining a first touch position of an active pen on a screen of the electronic terminal based on downlink signals collected by sensors under the screen of the electronic terminal;
   disabling, based on the detected first touch position, sensors outside a first preset region corresponding to the first touch position, where sensors in the first preset region are still in a working mode, the first touch position is included in the first preset region, and a quantity of sensors in the first preset region is less than a quantity of sensors under the screen of the electronic terminal; and
   determining a second touch position of the active pen on the screen of the electronic terminal based on downlink signals collected by the sensors in the first preset region.

It may be learned that, in this embodiment of this application, when a touch position of an active pen on a screen of an electronic terminal is detected, and once a first touch position of the active pen on the screen of the electronic terminal is detected based on downlink signals collected by the sensors under the screen of the electronic terminal, sensors outside a first preset region including the first touch position are disabled, and sensors in the first preset region are still in a working mode. In addition, a quantity of sensors in the first preset region is less than a quantity of sensors under the screen of the electronic terminal. In this way, when a second touch position of the active pen on the screen of the electronic terminal is subsequently determined, downlink signals sent by the active pen are collected only by using the sensors in the first preset region, instead of always by using all sensors under the screen of the electronic terminal, so that detection flexibility is improved.

In addition, in this embodiment of this application, when the second touch position of the active pen on the screen of the electronic terminal is determined based on downlink signals collected by sensors, only the sensors in the first preset region are still in a working mode. Therefore, the downlink signals are collected only by using the sensors in the first preset region. The sensors outside the first preset region are in an off mode, and no longer collect downlink signals. Compared with a conventional technology in which all sensors need to be always in a working mode to collect downlink signals, this reduces power consumption of the electronic terminal. In addition, when the electronic terminal subsequently calculates again, based on downlink signals collected by the sensors, the second touch position of the active pen on the screen of the electronic terminal, the downlink signals are no longer downlink signals collected by all sensors under the screen, but downlink signals collected by the sensors in the first preset region. In this way, a semaphore used to calculate the second touch position is reduced, and a calculation efficiency of the second touch position is improved.

In a possible implementation, the first touch position is a center point in the first preset region, and all sensors surrounding the first touch position are in a working mode. In this way, when the sensors that are in the first preset region and that surround the first touch position collect downlink signals sent by the active pen, a large quantity of valid signals may be collected, so that when the second touch position of the active pen on the screen of the electronic terminal is subsequently calculated based on the valid signals collected by the sensors in the first preset region, calculation accuracy of the second touch position can be further improved.

In a possible implementation, a shape of the first preset region is a regular pattern. For example, the regular pattern may be a circle or a rectangle.

In a possible implementation, the first preset region is a range that centers on the first touch position and includes M*N sensors surrounding the first touch position, where both M and N are positive integers.

In this possible implementation, when the second touch position of the active pen on the screen of the electronic terminal is determined based on the downlink signals collected by the sensors, only sensors in the range that centers on the first touch position and includes M*N sensors surrounding the first touch position are still in a working mode.

Therefore, only these sensors are used to collect downlink signals. Sensors outside the range that centers on the first touch position and includes M*N sensors surrounding the first touch position are in an off mode and no longer collect downlink signals. Compared with a conventional technology in which all sensors need to be always in a working mode to collect downlink signals, this reduces power consumption of the electronic terminal. In addition, when the electronic terminal subsequently calculates again, based on the downlink signals collected by the sensors, the second touch position of the active pen on the screen of the electronic terminal, the downlink signals are no longer downlink signals collected by all sensors under the screen, but downlink signals collected by the sensors in the range that centers on the first touch position and includes M*N sensors surrounding the first touch position. In this way, a semaphore used to calculate the second touch position is reduced, and a calculation efficiency of the second touch position is improved.

In a possible implementation, the first preset region is a range that centers on the first touch position and whose radius is a length of P sensors, where P is a positive integer.

In this possible implementation, when the second touch position of the active pen on the screen of the electronic terminal is determined based on the downlink signals collected by the sensors, only sensors in the range that centers on the first touch position and whose radius is a length of P sensors are still in a working mode. Therefore, only these sensors are used to collect downlink signals. Sensors outside the range that centers on the first touch position and whose radius is a length of P sensors are in an off mode and no longer collect downlink signals. Compared with a conventional technology in which all sensors need to be always in a working mode to collect downlink signals, this reduces power consumption of the electronic terminal. In addition, when the electronic terminal subsequently calculates again, based on the downlink signals collected by the sensors, the second touch position of the active pen on the screen of the electronic terminal, the downlink signals are no longer downlink signals collected by all sensors under the screen, but downlink signals collected by sensors in the range that centers on the first touch position and whose radius is a length of P sensors. In this way, a semaphore used to calculate the second touch position is reduced, and a calculation efficiency of the second touch position is improved.

In a possible implementation, the method for detecting an active pen touch position may further include: controlling a first sensor to be in a working mode when the first sensor totally falls in the first preset region, to determine a sensor that needs to be in a working mode.

In a possible implementation, the method for detecting an active pen touch position may further include: controlling a second sensor to be in a working mode when the second sensor partially falls in the first preset region, to determine a sensor that needs to be in a working mode.

In a possible implementation, the controlling a second sensor to be in a working mode when the second sensor partially falls in the first preset region may include:

when an area of the second sensor falling in the first preset region is greater than a preset threshold, controlling the second sensor to be in a working mode, to determine a sensor that needs to be in a working mode.

In a possible implementation, the method for detecting an active pen touch position may further include:

determining whether the second touch position and the first touch position are a same position.

When the second touch position and the first touch position are different positions, sensors outside the second preset region corresponding to the second touch position are disabled, and sensors in the second preset region are still in a working mode. In this way, only the sensors in the second preset region are still in a working mode. When downlink signals sent by the active pen are subsequently collected, the downlink signals are collected only by using the sensors in the second preset region, and the sensors outside the second preset region are in an off mode and no longer collect the downlink signals. Compared with a conventional technology in which all sensors need to be always in a working mode to collect downlink signals, this reduces power consumption of the electronic terminal. The second touch position is included in the second preset region, and a quantity of sensors in the second preset region is less than a quantity of sensors under the screen of the electronic terminal.

When the second touch position and the first touch position are a same position, the second preset region is the first preset region. Because the second preset region is still the first preset region, sensors outside the first preset region may continue to be disabled, and sensors in the first preset region continue to be in a working mode. In this way, only the sensors in the first preset region are still in a working mode. When downlink signals sent by the active pen are subsequently collected, the downlink signals are collected only by using the sensors in the first preset region, and the sensors outside the first preset region are in an off mode and no longer collect the downlink signals. Compared with a conventional technology in which all sensors need to be always in a working mode to collect downlink signals, this reduces power consumption of the electronic terminal.

In a possible implementation, the method for detecting an active pen touch position may further include: controlling sensors under the screen of the electronic terminal to be enabled, and controlling the sensors under the screen of the electronic terminal to send uplink signals to the active pen, where the uplink signals are used to wake up the active pen, so that downlink signals are collected from the active pen by using the sensors under the screen of the electronic terminal, and the first touch position of the active pen on the screen of the electronic terminal is determined based on the collected downlink signals.

It may be understood that, when all sensors under the screen of the electronic terminal are controlled to be enabled for the first time, all the sensors under the screen of the electronic terminal may be enabled when the electronic terminal is powered on. After the sensors are enabled, the sensors continuously send uplink signals. However, in this manner, when a user does not use the active pen temporarily, power consumption of the electronic terminal is high. To reduce power consumption of the electronic terminal, when the electronic terminal is powered on, all the sensors under the screen of the electronic terminal may not need to be enabled. Instead, after the electronic terminal establishes a Bluetooth connection to the active pen, all the sensors under the screen of the electronic terminal are controlled to be enabled. In this way, compared with a case in which all the sensors under the screen of the electronic terminal are enabled when the electronic terminal is powered on, power consumption of the electronic terminal is reduced.

According to a second aspect, an embodiment of this application further provides an electronic terminal, and the electronic terminal may include:

a determining unit, configured to determine a first touch position of an active pen on a screen of the electronic terminal based on downlink signals collected by sensors under the screen of the electronic terminal;

a controlling unit, configured to disable, based on the detected first touch position, sensors outside a first preset region corresponding to the first touch position, where sensors in the first preset region are still in a working mode, the first touch position is included in the first preset region, and a quantity of sensors in the first preset region is less than a quantity of sensors under the screen of the electronic terminal; and the determining unit, further configured to determine a second touch position of the active pen on the screen of the electronic terminal based on downlink signals collected by the sensors in the first preset region.

In a possible implementation, the first touch position is a central point of the first preset region.

In a possible implementation, a shape of the first preset region is a regular pattern.

In a possible implementation, the first preset region is a range that centers on the first touch position and includes M*N sensors surrounding the first touch position, where both M and N are positive integers.

In a possible implementation, the first preset region is a range that centers on the first touch position and whose radius is a length of P sensors, where P is a positive integer.

In a possible implementation, the controlling unit is further configured to control a first sensor to be in a working mode when the first sensor totally falls in the first preset region.

In a possible implementation, the controlling unit is further configured to control a second sensor to be in a working mode when the second sensor partially falls in the first preset region.

In a possible implementation, the controlling unit is further configured to: when an area of the second sensor falling in the first preset region is greater than a preset threshold, control the second sensor to be in a working mode.

In a possible implementation, the determining unit is further configured to determine whether the second touch position and the first touch position are a same position.

The controlling unit is further configured to: when the second touch position and the first touch position are different positions, disable sensors outside a second preset region corresponding to the second touch position, where sensors in the second preset region are still in a working mode, the second touch position is included in the second preset region, and a quantity of sensors in the second preset region is less than the quantity of sensors under the screen of the electronic terminal; or when the second touch position and the first touch position are a same position, determine that the second preset region is the first preset region.

In a possible implementation, the controlling unit is further configured to: control the sensors under the screen of the electronic terminal to be enabled, and control the sensors under the screen of the electronic terminal to send uplink signals to the active pen, where the uplink signals are used to wake up the active pen.

According to a third aspect, an embodiment of this application further provides an electronic terminal, where the electronic terminal includes a processor and a memory, the memory stores a computer program, and the processor executes the computer program stored in the memory, so that the electronic terminal is enabled to perform the method for detecting an active pen touch position according to any one of the possible implementations in the first aspect.

According to a fourth aspect, an embodiment of this application further provides an electronic terminal, where the electronic terminal includes a processor and an interface circuit.

The interface circuit is configured to receive code instructions and transmit the code instructions to the processor.

The processor is configured to run the code instructions to execute the method for detecting an active pen touch position according to any one of possible implementations in the first aspect.

According to a fifth aspect, an embodiment of this application further provides a readable storage medium, configured to store instructions, where when the instructions are executed, the method for detecting an active pen touch position according to any one of possible implementations in the first aspect is implemented.

According to a sixth aspect, an embodiment of this application further provides a chip. The chip stores a computer program, and when the computer program is executed by a processor, the method for detecting an active pen touch position according to any one of possible implementations in the first aspect is performed.

According to the method for detecting an active pen touch position, and the electronic terminal, when a touch position of an active pen on a screen of an electronic terminal is detected, and once a first touch position of the active pen on the screen of the electronic terminal is detected based on downlink signals collected by sensors under the screen of the electronic terminal, sensors outside a first preset region including the first touch position are disabled, where sensors in the first preset region are still in a working mode. In addition, a quantity of sensors in the first preset region is less than a quantity of sensors under the screen of the electronic terminal. In this way, when a second touch position of the active pen on the screen of the electronic terminal is subsequently determined, downlink signals sent by the active pen are collected only by using the sensors in the first preset region, instead of always by using all sensors under the screen of the electronic terminal, so that detection flexibility is improved.

BRIEF DESCRIPTION OF DRAWINGS

FIG. 12 is a schematic diagram of scanning when sensors collect downlink signals from an active pen according to an embodiment of this application;

FIG. 13 is another schematic diagram of scanning when sensors collect downlink signals from an active pen according to an embodiment of this application;

DESCRIPTION OF EMBODIMENTS

Figure 1:
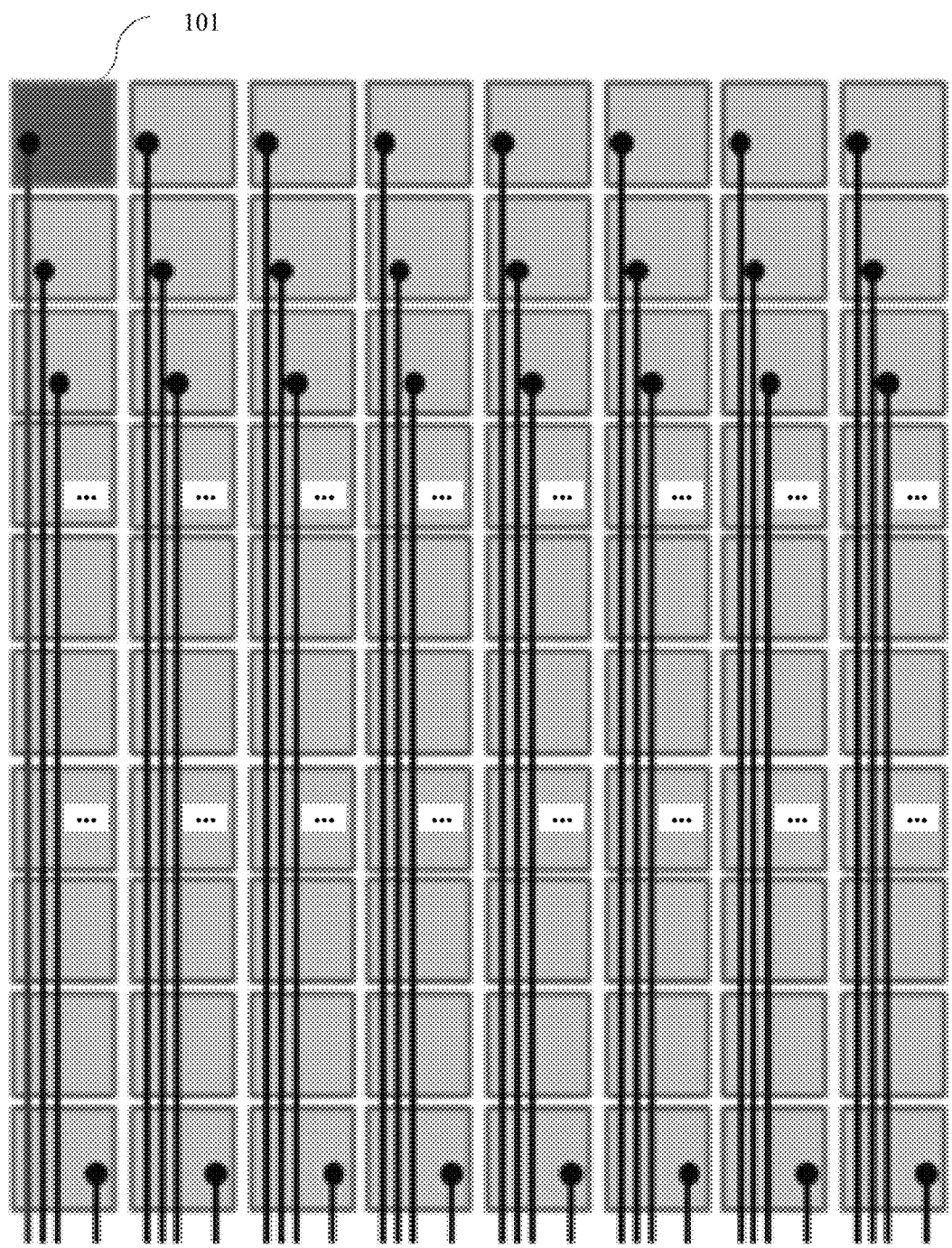
FIG. 1 is a schematic arrangement diagram of pure self-capacitance sensors according to an embodiment of this application.

A method for detecting a touch position provided in embodiments of this application may be applied to an electronic terminal having an organic light-emitting diode (organic light-emitting diode, OLED) screen, another electronic terminal that may appear in the future and that can control enabling or disabling of a sensor under a screen by region, or the like. This is not limited in embodiments of this application. For example, the electronic terminal having an OLED may be an electronic terminal that performs detection by using a pure self-capacitance touchpad (touchpad, TP). For example, FIG. 1 is a schematic arrangement diagram of pure self-capacitance sensors 101 according to an embodiment of this application, or may be an electronic terminal that uses mutual capacitance TP detection. This may be specifically set based on an actual requirement. When the method for detecting a touch position provided in embodiments of this application is subsequently described, an electronic terminal using pure self-capacitance TP detection is used as an example for description in embodiments of this application. However, it does not mean that embodiments of this application are merely limited thereto.

The electronic terminal is also referred to as a terminal device or user equipment, and is a device that provides voice and/or data connectivity for a user, for example, a hand-held device or a vehicle-mounted device that has a wireless connection function. A common terminal device includes, for example, a mobile phone, a tablet computer, a notebook computer, a palmtop computer, a mobile internet device (mobile internet device, MID), or another device that can perform a screen touch operation by using an active pen.

In embodiments of this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be singular or plural. In the descriptions of this application, the character "/" usually indicates an "or" relationship between the associated objects.

Figure 2:
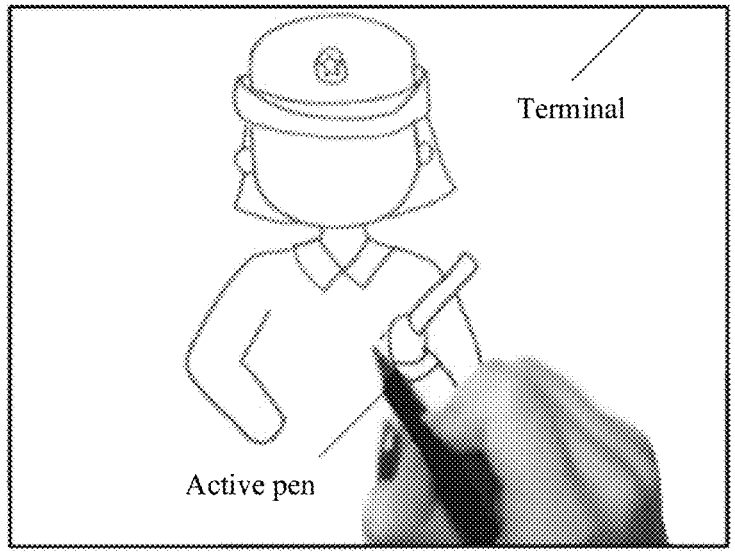
FIG. 2 is a schematic diagram of an application scenario according to an embodiment of this application.

FIG. 2 is a schematic diagram of an application scenario according to an embodiment of this application. For example, as shown in FIG. 2, in a process in which a user draws on a screen of an electronic terminal by using an active pen, the electronic terminal needs to continuously detect a touch position of the active pen on the screen of the electronic terminal. When a touch position of the active pen on the screen of the electronic terminal is detected, all sensors under the screen of the electronic terminal are enabled, downlink signals sent by the active pen are continuously collected by using each sensor, and then a touch position of the active pen on the screen of the electronic terminal is determined based on the downlink signals collected by each sensor. In this case, this detection manner is fixed, and has low flexibility. It may be understood that, generally, a touch position of the active pen on the screen of the electronic terminal may be understood as a touch position of a nib of the active pen on the screen of the electronic terminal.

Figure 3:
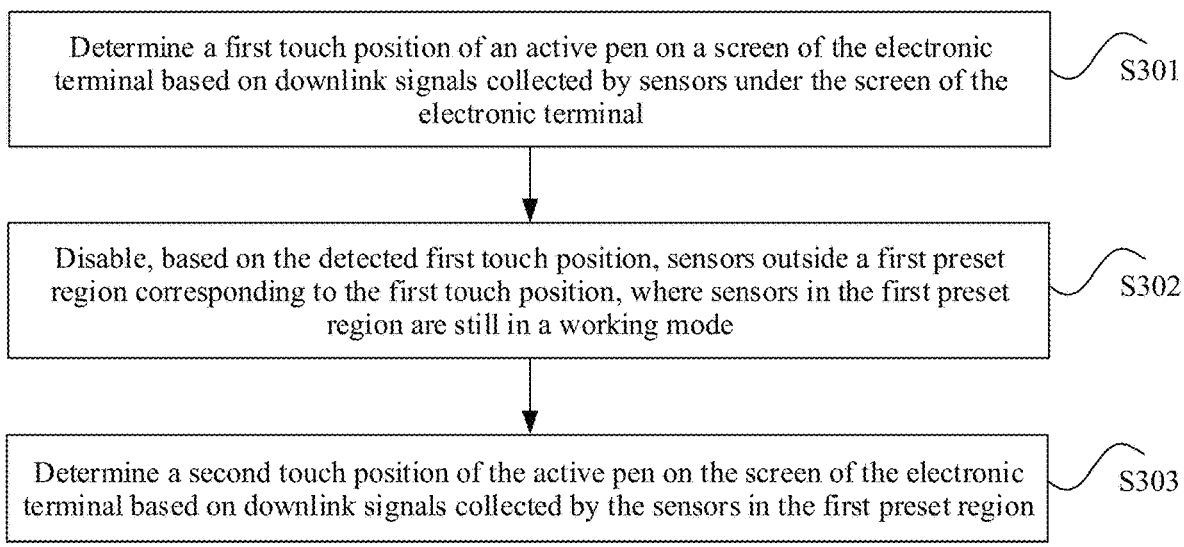
FIG. 3 is a schematic flowchart of a method for detecting an active pen touch position according to an embodiment of this application.

To improve detection flexibility when a touch position of an active pen on a screen of an electronic terminal is detected, an embodiment of this application provides a method for detecting a touch position. For example, FIG. 3 is a schematic flowchart of a method for detecting an active pen touch position according to an embodiment of this application. The method for detecting a touch position may include the following steps: S301: Determine a first touch position of an active pen on a screen of an electronic terminal based on downlink signals collected by sensors under the screen of the electronic terminal. S302: Disable, based on the detected first touch position, sensors outside a first preset region corresponding to the first touch position, where sensors in the first preset region are still in a working mode. S303: Determine a second touch position of the active pen on the screen of the electronic terminal based on downlink signals collected by the sensors in the first preset region. The first touch position is included in the first preset region, and a quantity of sensors in the first preset region is less than a quantity of all sensors under the screen of the electronic terminal. It can be learned that, different from a conventional technology, in this embodiment of this application, once the first touch position of the active pen on the screen of the electronic terminal is detected, the sensors outside the first preset region are controlled to be disabled. In other words, only the sensors in the first preset region including the first touch position are still in a working mode. In this way, when the second touch position of the active pen on the screen of the electronic terminal is subsequently determined, downlink signals sent by the active pen are collected only by using the sensors in the first preset region, instead of always by using all sensors under the screen of the electronic terminal, so that detection flexibility is improved when the second touch position of the active pen on the screen of the electronic terminal is detected. The second touch position may be the same as the first touch position, or may be different from the first touch position, and is a new control position. When the second touch position is the same as the first touch position, it may be understood that the active pen currently stays at the first touch position, and does not move on the screen of the electronic terminal. When the second touch position is different from the first touch position, it may be understood that the active pen moves on the screen of the electronic terminal, and moves from the first touch position to a new touch position, that is, the second touch position.

In addition, in this embodiment of this application, when the second touch position of the active pen on the screen of the electronic terminal is determined based on downlink signals collected by sensors, only the sensors in the first preset region are still in a working mode. Therefore, the downlink signals are collected only by using the sensors in the first preset region. The sensors outside the first preset region are in an off mode, and no longer collect downlink signals. Compared with a conventional technology in which all sensors need to be always in a working mode to collect downlink signals, this reduces power consumption of the electronic terminal. In addition, when the electronic terminal subsequently calculates again, based on downlink signals collected by the sensors, the second touch position of the active pen on the screen of the electronic terminal, the downlink signals are no longer downlink signals collected by all sensors under the screen, but downlink signals collected by the sensors in the first preset region. In this way, a semaphore used to calculate the second touch position is reduced, and a calculation efficiency of the second touch position is improved.

It can be learned that, in this embodiment of this application, once the first touch position of the active pen on the screen of the electronic terminal is detected, the sensors outside the first preset region are controlled to be disabled. In this way, when the second touch position of the active pen on the screen of the electronic terminal is subsequently determined, downlink signals sent by the active pen are collected only by using the sensors in the first preset region, instead of always by using all sensors under the screen of the electronic terminal, so that detection flexibility is improved when the second touch position of the active pen on the screen of the electronic terminal is detected. It may be understood that, before the sensors outside the first preset region are controlled to be disabled, the first preset region needs to be first determined based on the first touch position, and then the sensors outside the first preset region can be controlled to be disabled when the first touch position of the active pen on the screen of the electronic terminal is detected.

Figure 4:
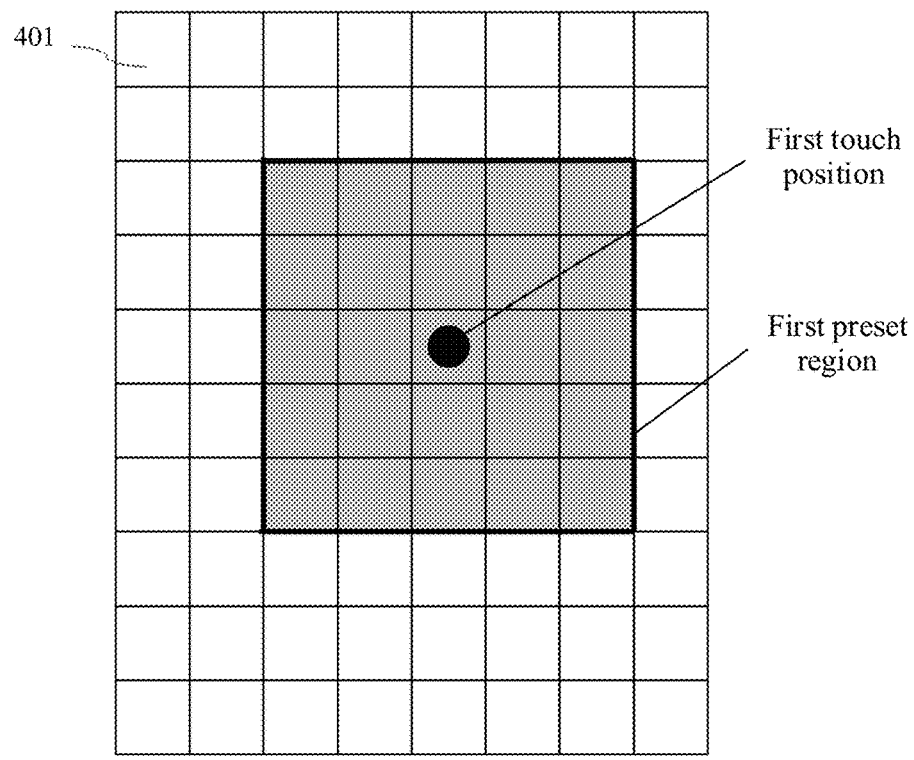
FIG. 4 is a schematic diagram of a relationship between a first touch position and a first preset region according to an embodiment of this application.
Figure 5:
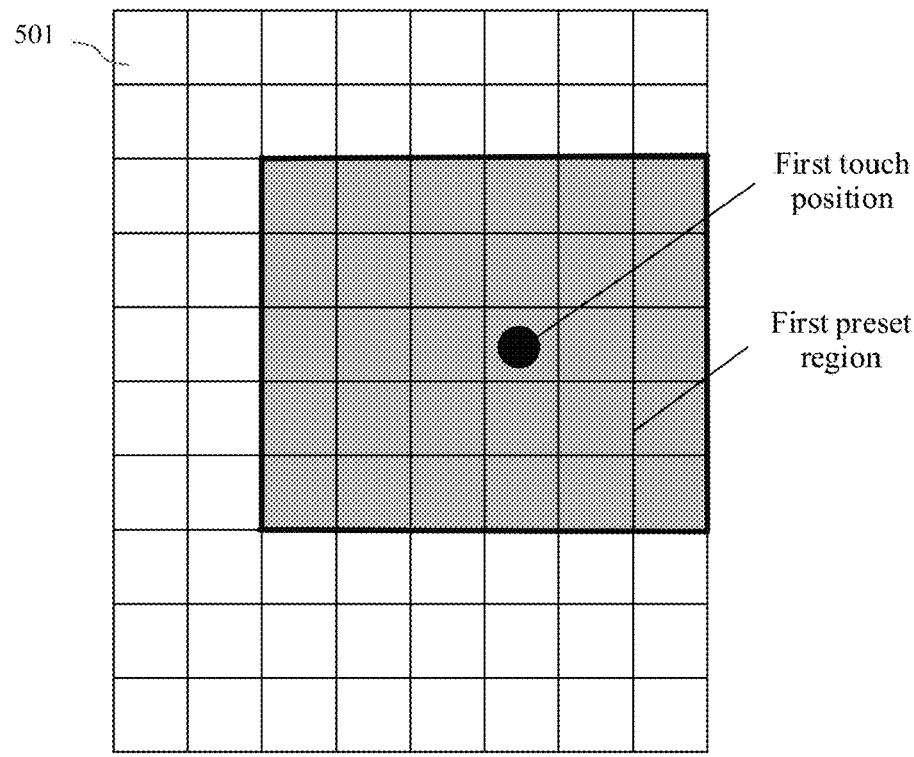
FIG. 5 is a schematic diagram of a relationship between a first touch position and a first preset region according to an embodiment of this application.

For example, when the first preset region is determined based on the first touch position, a shape of the first preset region may be a regular pattern. For example, when the shape of the first preset region is a regular pattern, the first touch position may be a central point of the first preset region. For example, FIG. 4 is a schematic diagram of a relationship between a first touch position and a first preset region, in an array of sensors 401, according to an embodiment of this application. Certainly, alternatively, the first touch position may not be a center point of the first preset region. For example, FIG. 5 is a schematic diagram of a relationship between a first touch position and a first preset region, in an array of sensors 501, according to an embodiment of this application. It may be understood that, when the first touch position may be a center point in the first preset region, all sensors surrounding the first touch position are in a working mode. In this way, when the sensors that are in the first preset region and that surround the first touch position collect downlink signals sent by the active pen, a large quantity of valid signals may be collected, so that when the second touch position of the active pen on the screen of the electronic terminal is subsequently calculated based on the valid signals collected by the sensors in the first preset region, calculation accuracy of the second touch position can be further improved. Certainly, the shape of the first preset region may be an irregular pattern. When the first preset region is determined, regardless of whether the first preset region is a regular region or an irregular region, provided that the first preset region includes the first touch position, and the downlink signals collected by the sensors in the first preset region are sufficient to determine the second touch position of the active pen on the screen of the electronic terminal, the first region can be determined. The following uses an example in which the shape of the first preset region is a regular pattern and the first touch position is a central point of the first preset region for description.

Figure 6:
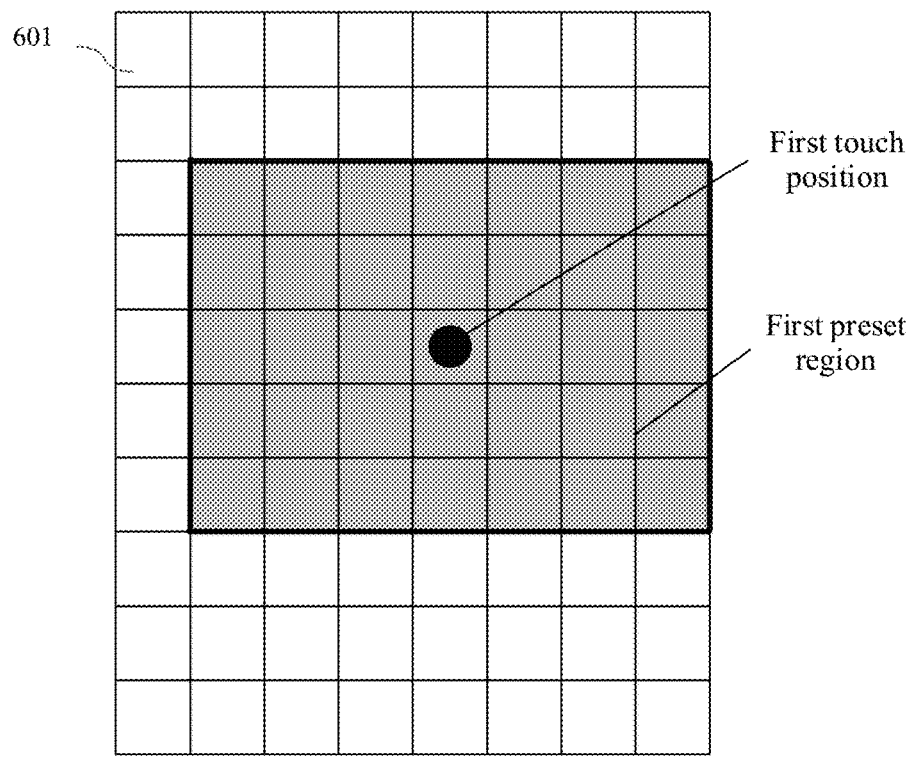
FIG. 6 is a schematic diagram in which a first preset region is a rectangular region according to an embodiment of this application.

When the first preset region is determined, for example, in a possible implementation, the first preset region may be a range that centers on the first touch position and includes M*N sensors surrounding the first touch position, where both M and N are positive integers. Herein, values of M and N may be specifically set based on an actual requirement, provided that downlink signals collected by sensors in the range that centers on the first touch position and includes M*N sensors surrounding the first touch position are sufficient to determine the second touch position of the active pen on the screen of the electronic terminal. In this possible implementation, the first preset region determined based on the range that includes the M*N surrounding sensors may be rectangular. For example, FIG. 6 is a schematic diagram in which a first preset region is a rectangular region, in an array of sensors 601, according to an embodiment of this application.

In another possible implementation, the first preset region is a range that centers on the first touch position and whose radius is a length of P sensors, where P is a positive integer. Herein, a value of P may be specifically set based on an actual requirement, provided that downlink signals collected by sensors in the range that centers on the first touch position and whose radius is a length of P sensors are sufficient to determine the second touch position of the active pen on the screen of the electronic terminal. In this possible implementation, the first preset region determined based on the range whose radius is a length of P sensors is circular. For example, FIG. 7 is a schematic diagram in which a first preset region is a circular region, in an array of sensors 701 according to an embodiment of this application.

Figure 7:
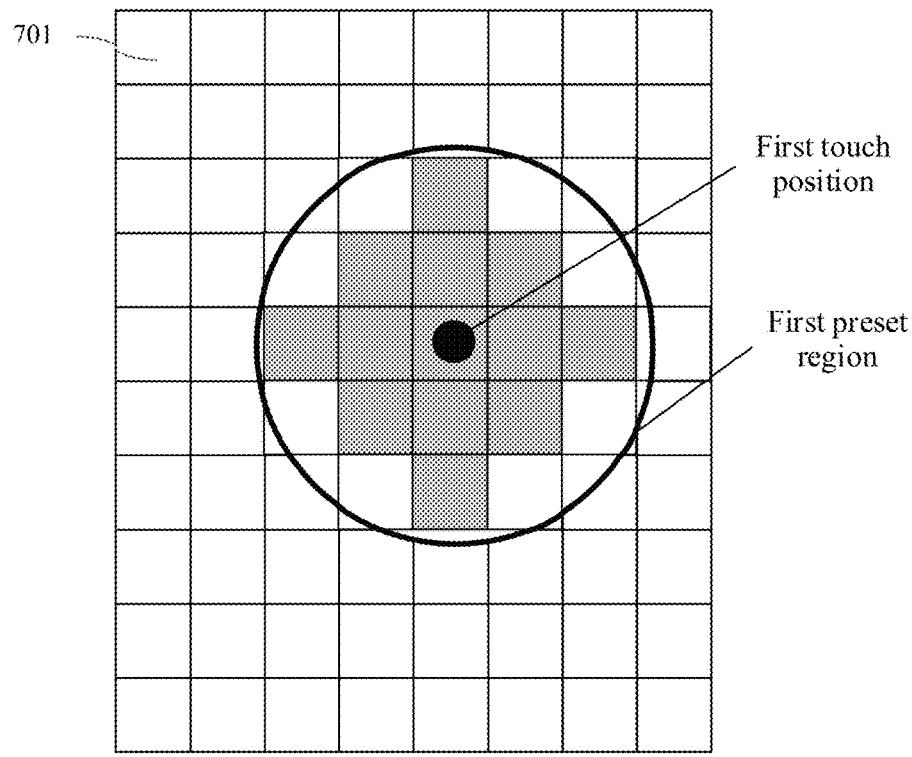
FIG. 7 is a schematic diagram in which a first preset region is a circular region according to an embodiment of this application.
Figure 8:
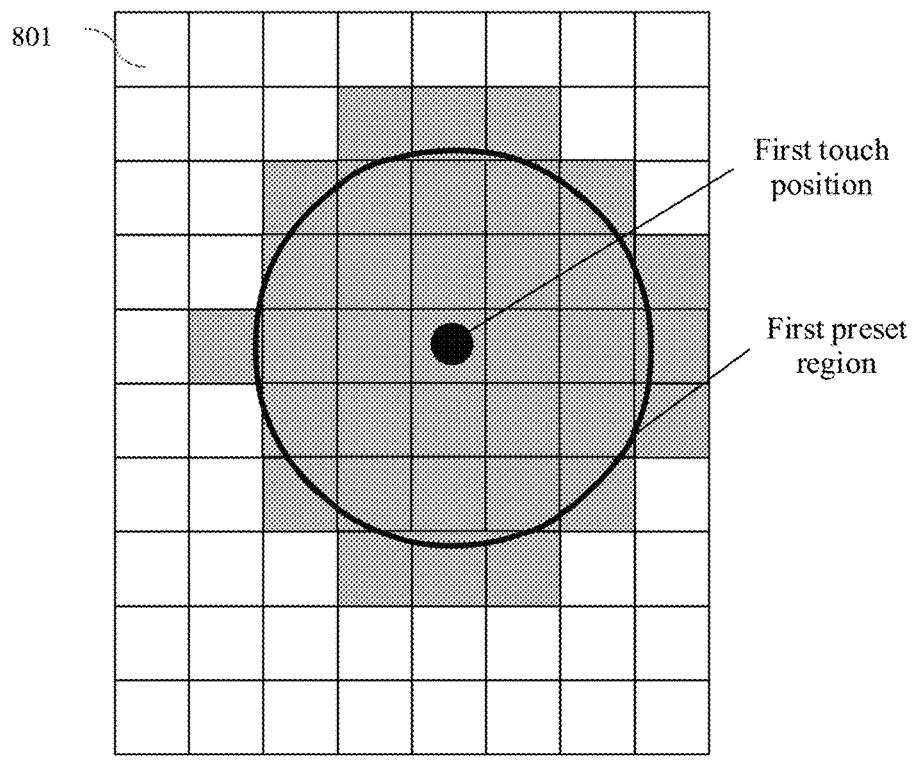
FIG. 8 is a schematic diagram of sensors in a first preset region according to an embodiment of this application.
Figure 9:
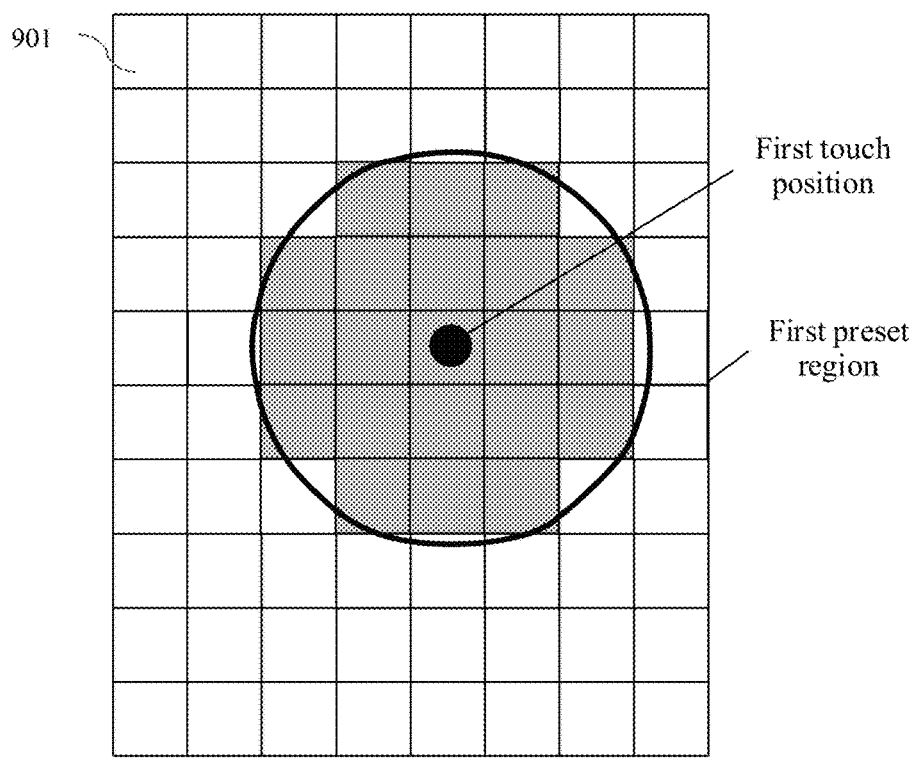
FIG. 9 is another schematic diagram of sensors in a first preset region according to an embodiment of this application.

With reference to FIG. 7, when the first preset region is a range that centers on the first touch position and whose radius is a length of P sensors, it needs to be determined whether a sensor on an edge of the first preset region is a sensor in the first preset region. In other words, it is determined whether a sensor on an edge of the first preset region needs to continue to be in a working mode. During determining, at least the following two possible implementations may be included. In one possible implementation, for any first sensor, when the first sensor totally falls in the first preset region, it is determined that the first sensor is a sensor in the first preset region, and the first sensor is controlled to be in a working mode, as shown in FIG. 7. In another possible implementation, to obtain more downlink signals, the first preset region may be controlled to include as many sensors as possible. Based on this, when any second sensor partially falls in the first preset region, it is determined that the first sensor is a sensor in the first preset region, and the second sensor is controlled to be in a working mode. For example, FIG. 8 is a schematic diagram of sensors in a first preset region, in an array of sensors 801, according to an embodiment of this application. It can be learned from FIG. 8 that for any second sensor, even if only a small region falls in the first preset region, the second sensor may be determined as a sensor in the first preset region, and the second sensor is controlled to be in a working mode. In addition, it is clearly that a quantity of sensors in the first preset region shown in FIG. 8 is greater than a quantity of sensors in the first preset region shown in FIG. 7. Therefore, to reduce the quantity of sensors in the first preset region shown in FIG. 8, it may be further determined whether an area of the second sensor falling in the first preset region is greater than the preset region. When the area of the second sensor falling in the first preset region is greater than the preset region, the second sensor is determined as a sensor in the first preset region, and the second sensor is controlled to be in a working mode. For example, FIG. 9 is another schematic diagram of sensors 901 in a first preset region according to an embodiment of this application. With reference to FIG. 9, it can be learned that for any second sensor, the second sensor can be determined as a sensor in the first preset region only when a large region of the second sensor falls in the first preset region. In addition, both a shape and an area of the first preset region may be variable. When the first touch position is located in different regions, the first touch position may correspond to different shapes and areas of the first preset region. For example, when the first touch position is located at an edge or a corner of a screen, the first touch position may correspond to a semi-circular or sector-shaped shape of the first preset region, and when the first touch position is located at a non-edge of the screen, the first touch position may correspond to a circular or rectangular shape of the first preset region. The present invention is not limited to a specific setting form. It may be understood that, in this embodiment of this application, only the three possible implementations are used as examples describe whether a sensor on an edge of the first preset region is a sensor in the first preset region. An implementation may be specifically set based on an actual requirement. For how to determine whether a sensor on an edge of the first preset region is a sensor in the first preset region, this is not specifically limited in this embodiment of this application.

The following describes in detail the technical solutions provided in embodiments of this application by using several embodiments. It may be understood that the following several specific embodiments may be combined with each other, and a same or similar concept or process may not be described again in some embodiments. In subsequent descriptions, an example in which the first preset region is a rectangular region is used for description. However, it does not mean that this embodiment of this application is merely limited thereto.

Figure 10:
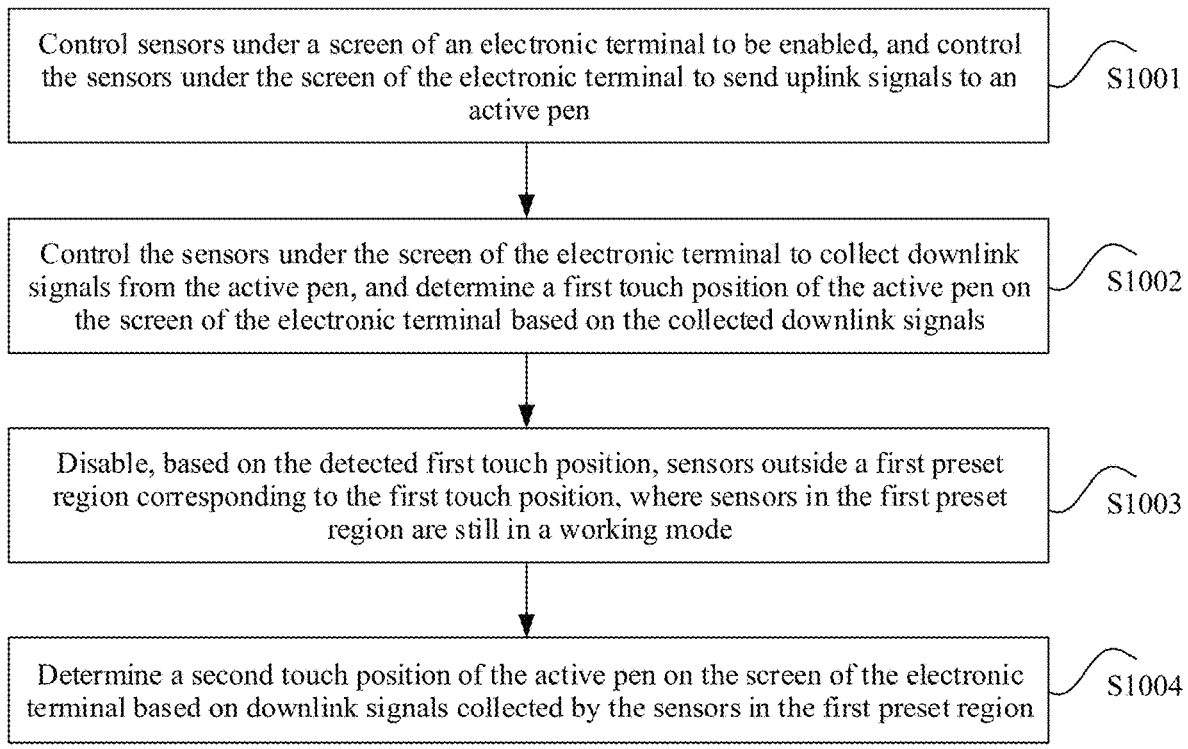
FIG. 10 is a schematic flowchart of another method for detecting an active pen touch position according to an embodiment of this application.

FIG. 10 is a schematic flowchart of another method for detecting an active pen touch position according to an embodiment of this application. The method for detecting a touch position may be performed by a processing chip or a processing circuit in an electronic terminal. For example, as shown in FIG. 10, the method for detecting a touch position may include the following steps.

S1001: Control sensors under a screen of the electronic terminal to be enabled, and control the sensors under the screen of the electronic terminal to send uplink signals to an active pen.

Generally, when the sensors under the screen of the electronic terminal are controlled to be enabled for the first time, all sensors under the screen of the electronic terminal are controlled to be enabled. When the sensors are enabled for the first time, the electronic terminal cannot learn of a specific region that is on the screen of the electronic terminal and that is to be touched by the active pen. Therefore, to accurately determine, based on downlink signals sent by the active pen, a first touch position of the active pen on the screen of the electronic terminal for the first time, all sensors under the screen of the electronic terminal are controlled to be enabled. In this way, the downlink signals sent by the active pen may be collected by using each sensor, and the first touch position of the active pen on the screen of the electronic terminal is determined based on the downlink signals collected by each sensor.

When all the sensors under the screen of the electronic terminal are controlled to be enabled for the first time, all the sensors under the screen of the electronic terminal may be enabled when the electronic terminal is powered on. After the sensors are enabled, the sensors continuously send uplink signals. However, in this manner, when a user does not use the active pen temporarily, power consumption of the electronic terminal is high. To reduce power consumption of the electronic terminal, when the electronic terminal is powered on, all the sensors under the screen of the electronic terminal may not need to be enabled. Instead, after the electronic terminal establishes a Bluetooth connection to the active pen, all the sensors under the screen of the electronic terminal are controlled to be enabled. In this way, compared with a case in which all the sensors under the screen of the electronic terminal are enabled when the electronic terminal is powered on, power consumption of the electronic terminal is reduced.

Figure 11:
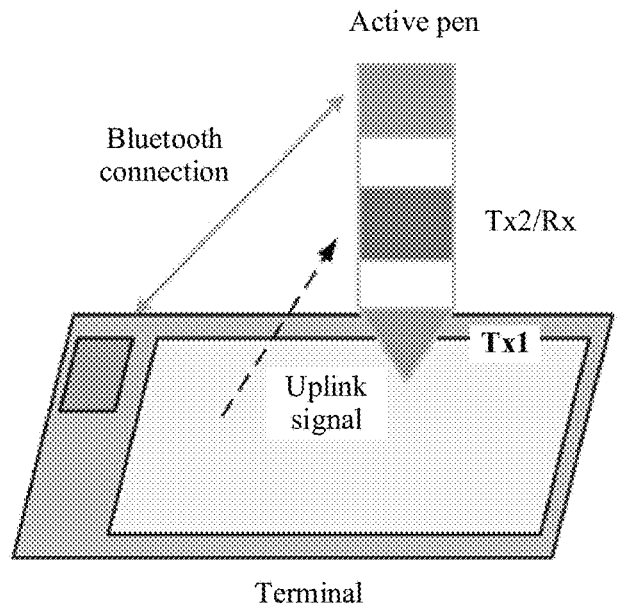
FIG. 11 is a schematic diagram of interaction between a terminal and an active pen according to an embodiment of this application.

After all sensors under the screen of the electronic terminal are controlled to be enabled, the sensors under the screen of the electronic terminal are controlled to start to send uplink signals to the active pen. For example, FIG. 11 is a schematic diagram of interaction between an electronic terminal and an active pen according to an embodiment of this application. After receiving uplink signals by using a second electrode Rx, the active pen starts to emit downlink signals and maintains emitting the downlink signals for a preset time period, for example, 10 s. When receiving no uplink signal sent by sensors under a screen within 10 s, the active pen stops outputting the downlink signals and enters a sleep mode. On the contrary, when receiving the uplink signals sent by the sensors under the screen within 10 s, the active pen enters a wakeup mode. After entering the wakeup mode, a first electrode Tx1 is used to send downlink signals to the electronic terminal, so that the sensors under the screen of the electronic terminal collect the downlink signals sent by the active pen, and determines a first touch position of the active pen on the screen of the electronic terminal based on the collected downlink signals. That is, the following S1002 is performed.

S1002: Control the sensors under the screen of the electronic terminal to collect the downlink signals from the active pen, and determine the first touch position of the active pen on the screen of the electronic terminal based on the collected downlink signals.

For example, when the sensors under the screen of the electronic terminal are controlled to collect the downlink signals from the active pen, and a touch position of the active pen on the screen of the electronic terminal is determined based on the collected downlink signals, at least the following two possible implementations may be included.

Figures 12, 13:
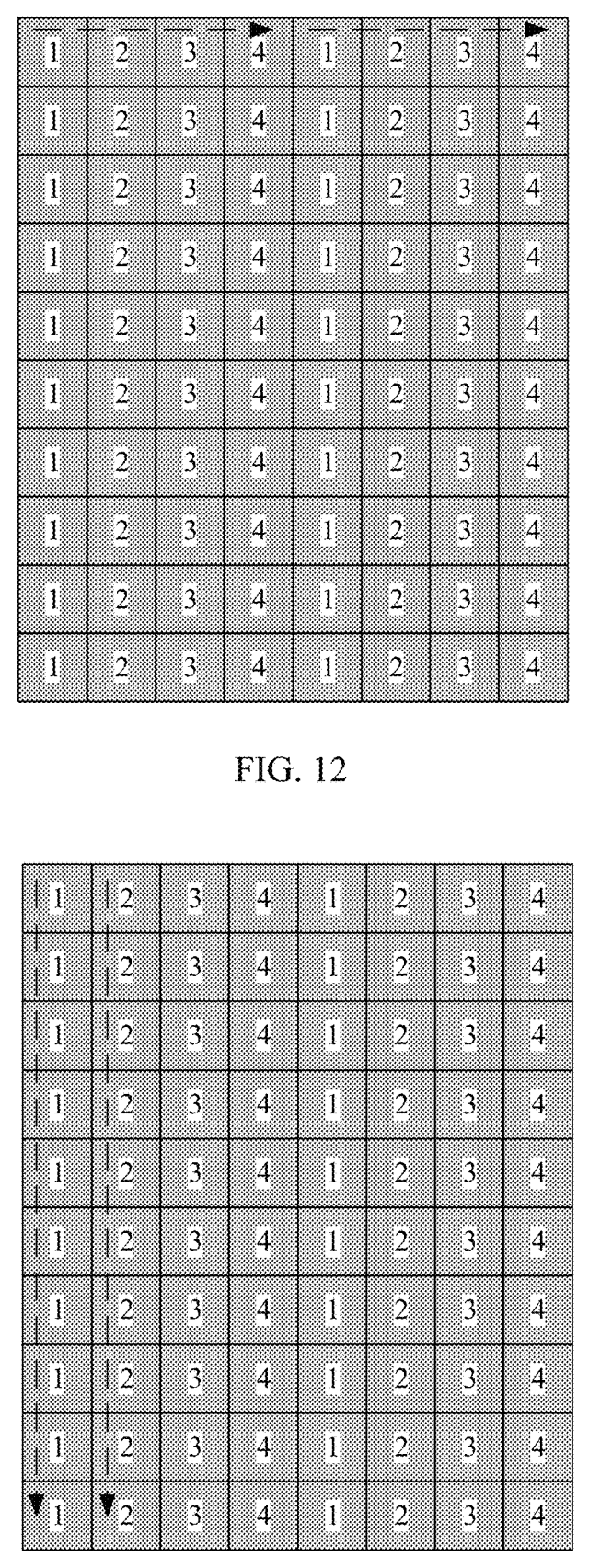

In a possible implementation, FIG. 12 is a schematic diagram of scanning when sensors collect downlink signals from an active pen according to an embodiment of this application. When the sensors under the screen of the electronic terminal are controlled to scan and collect the downlink signals sent by the active pen, a sensor 1, a sensor 2, a sensor 3, and a sensor 4 may be used at different time to scan, based on a sequence of the sensor 1→the sensor 2→the sensor 3→the sensor 4, the downlink signals sent by the active pen, to collect the downlink signals sent by the active pen. In this way, after collecting the downlink signals sent by the active pen, the sensors under the screen of the electronic terminal may send the collected downlink signals to an integrated circuit (integrated circuit, IC) of the electronic terminal. The integrated circuit converts the received downlink signals into digital signals, and sends the digital signals obtained through conversion to a processing chip or a processing circuit of the electronic terminal. The processing chip or the processing circuit may calculate the first touch position of the active pen on the screen of the electronic terminal based on these digital signals, to determine the first touch position of the pen on the screen of the electronic terminal.

In this possible implementation, when the sensor 1, the sensor 2, the sensor 3, and the sensor 4 are used at different time to scan the downlink signals sent by the active pen, scanning may be performed in a top-to-bottom order, or scanning may be performed in a bottom-to-top order. Certainly, scanning may alternatively be performed in an order from the middle to upper and lower sides. An order may be specifically set based on an actual requirement. Herein, for how to use the sensor 1, the sensor 2, the sensor 3, and the sensor 4 at different time to scan the downlink signals sent by the active pen, this is not specifically limited in this embodiment of this application.

In another possible implementation, FIG. 13 is another diagram of scanning when sensors collect downlink signals from an active pen according to an embodiment of this application. When the sensors under the screen of the electronic terminal are controlled to scan and collect the downlink signals sent by the active pen, the sensor 1, the sensor 2, the sensor 3, and the sensor 4 may be connected in parallel to scan, as a whole, the downlink signals sent by the active pen, to collect the downlink signals sent by the active pen. In this way, after collecting the downlink signals sent by the active pen, the sensors under the screen of the electronic terminal may send the collected downlink signals to an IC of the electronic terminal. The IC converts the received downlink signals into digital signals, and sends the digital signals obtained through conversion to the processing chip or the processing circuit of the electronic terminal. The processing chip or the processing circuit may calculate the first touch position of the active pen on the screen of the electronic terminal based on these digital signals, to determine the first touch position of the pen on the screen of the electronic terminal.

In this possible implementation, when the sensor 1, the sensor 2, the sensor 3, and the sensor 4 are connected in parallel to scan, as a whole, the downlink signals sent by the active pen, scanning may be performed in a left-to-right order, or scanning may be performed in a right-to-left order. Certainly, scanning may alternatively be performed in an order from the middle to the left and right sides. An order may be specifically set based on an actual requirement. Herein, for how to connect the sensor 1, the sensor 2, the sensor 3, and the sensor 4 in parallel to scan, as a whole, the downlink signals sent by the active pen, this is not specifically limited in this embodiment of this application.

S1003: Disable, based on the detected first touch position, sensors outside a first preset region corresponding to the first touch position, where sensors in the first preset region are still in a working mode.

The first touch position is included in the first preset region, and a quantity of sensors in the first preset region is less than a quantity of all sensors under the screen of the electronic terminal.

Figure 14:
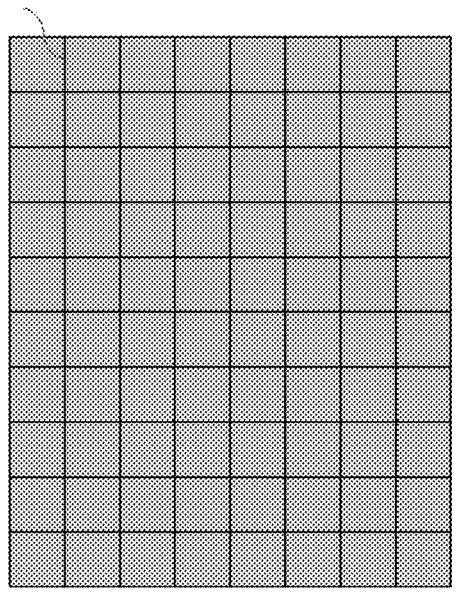
FIG. 14 is a schematic diagram of a relationship between a first touch position and a first preset region according to an embodiment of this application.
Figure 14:
Figure 14:
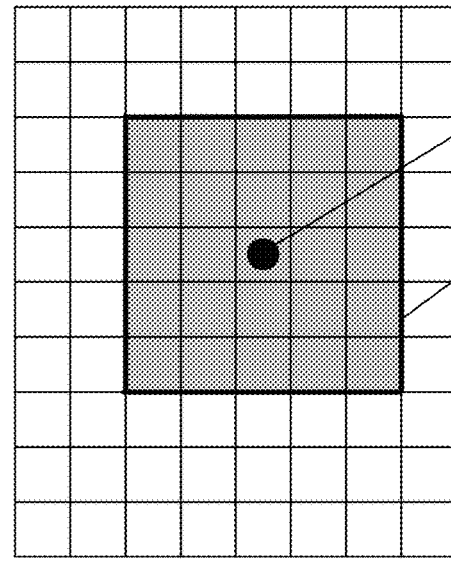

When the sensors outside the first preset region are controlled to be disabled based on the first touch position of the active pen on the screen of the electronic terminal, for ease of understanding, descriptions may be provided with reference to a plurality of different scenarios of the first touch position. For example, in a possible scenario, it is assumed that a first touch position of an active pen on a screen of an electronic terminal is in the middle of the screen of the electronic terminal, as shown in FIG. 14. FIG. 14 is a schematic diagram of a relationship between a first touch position and a first preset region, in an array of sensors 1401, according to an embodiment of this application. It can be learned that the first preset region is a range that centers on the first touch position and includes 5*5 sensors surrounding the first touch position. In this scenario, all sensors outside the range that includes the 5*5 surrounding sensors may be disabled. In this way, only sensors in the range that includes the 5*5 surrounding sensors are still in a working mode. When downlink signals sent by the active pen are subsequently collected, the downlink signals are collected only by using the sensors in the range that includes the 5*5 surrounding sensors, and the sensors outside the range that includes the 5*5 surrounding sensors are in an off mode and no longer collects the downlink signals. Compared with a conventional technology in which all sensors need to be always in a working mode to collect downlink signals, this reduces power consumption of the electronic terminal.

Figure 15:
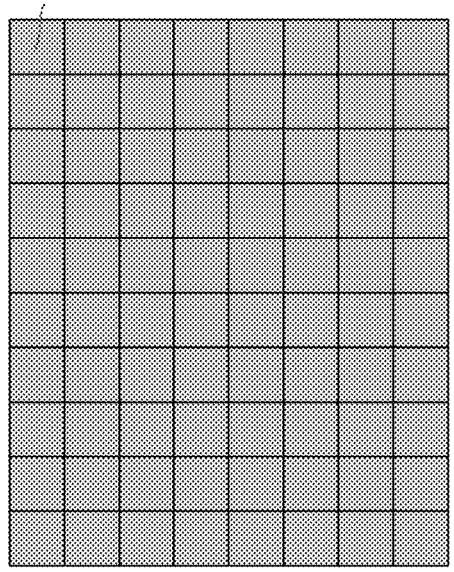
FIG. 15 is a schematic diagram of another relationship between a first touch position and a first preset region according to an embodiment of this application.
Figure 15:
Figure 15:
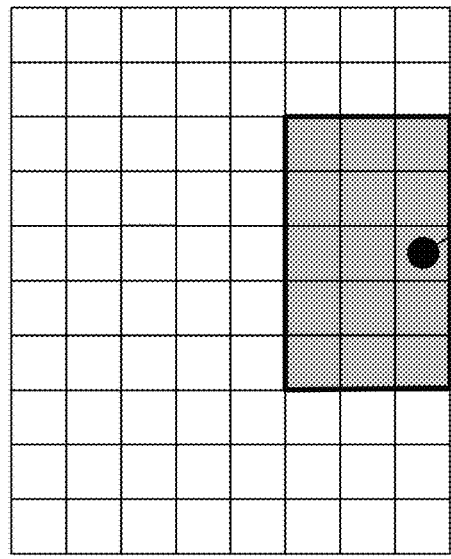

In another possible scenario, it is assumed that a first touch position of an active pen on a screen of an electronic terminal is at an edge position of the screen of the electronic terminal, as shown in FIG. 15. FIG. 15 is a schematic diagram of another relationship between a first touch position and a first preset region, in an array of sensors 1501, according to an embodiment of this application. It can be learned that the first preset region is a range of 3*5 sensors, and the first touch position is a position of an intermediate sensor in a last column in the range of the 3*5 sensors. In this scenario, all sensors outside the range of the 3*5 sensors may be disabled. In this way, only sensors in the range of the 3*5 sensors are still in a working mode. When downlink signals sent by the active pen are subsequently collected, the downlink signals are collected only by using the sensors in the range of the 3*5 sensors, and the sensors outside the range of the 3*5 sensors are in an off mode and no longer collects the downlink signals. Compared with a conventional technology in which all sensors need to be always in a working mode to collect downlink signals, this reduces power consumption of the electronic terminal.

Figure 16:
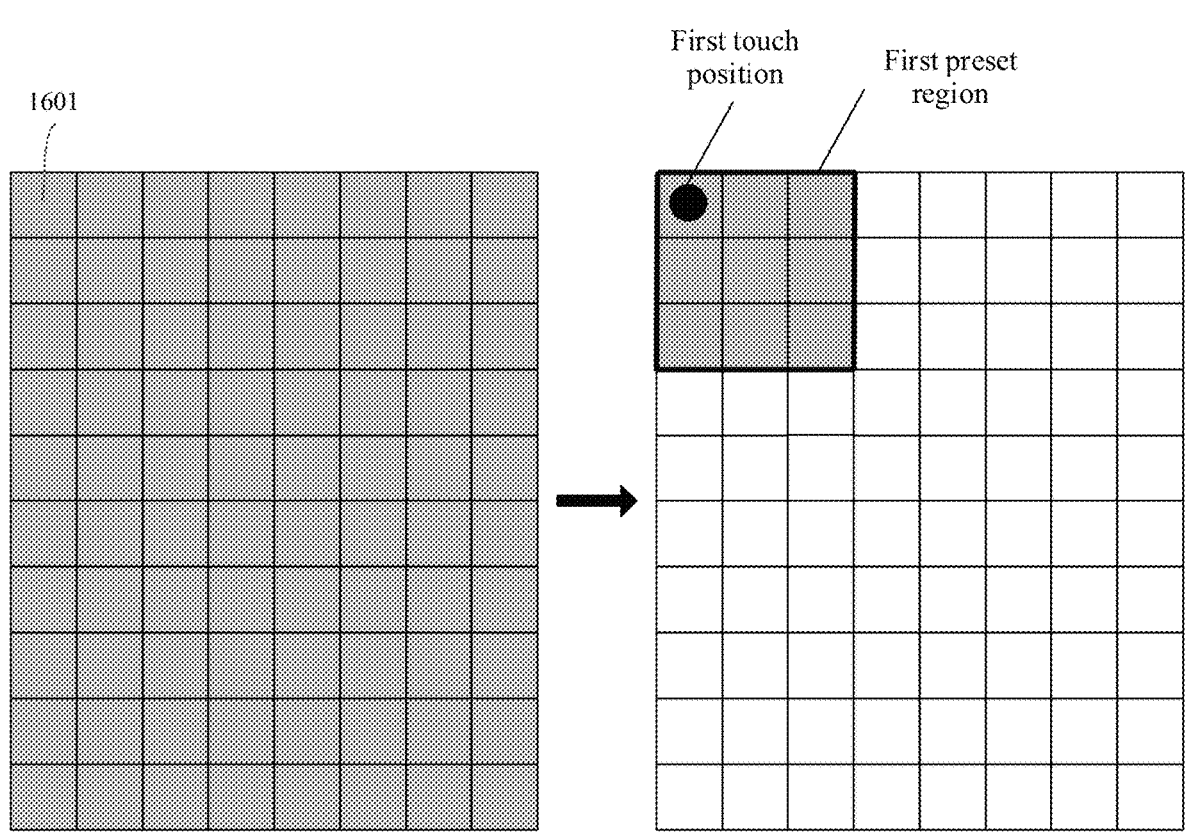
FIG. 16 is a schematic diagram of still another relationship between a first touch position and a first preset region according to an embodiment of this application.

In still another possible scenario, it is assumed that a first touch position of an active pen on a screen of an electronic terminal is at an included angle position of the screen of the electronic terminal, as shown in FIG. 16. FIG. 16 is a schematic diagram of still another relationship between a first touch position and a first preset region, in an array of sensors 1601, according to an embodiment of this application. It can be learned that the first preset region is a range of 3*3 sensors, and the first touch position is a position of the first sensor at an upper left corner in the range of the 3*3 sensors. In this scenario, all sensors outside the range of the 3*3 sensors may be disabled. In this way, only sensors in the range of the 3*3 sensors are still in a working mode. When downlink signals sent by the active pen are subsequently collected, the downlink signals are collected only by using the sensors in the range of the 3*3 sensors, and the sensors outside the range of the 3*3 sensors are in an off mode and no longer collects the downlink signals. Compared with a conventional technology in which all sensors need to be always in a working mode to collect downlink signals, this reduces power consumption of the electronic terminal.

Certainly, when sensors outside the first preset region corresponding to the first touch position are disabled, a correspondence between the first touch position and sensors that needs to be kept in a working mode may be further preset. In this way, after the first touch position is determined, the sensors that need to be kept in a working mode may be determined based on the correspondence, and other sensors need to be disabled. Alternatively, a correspondence between the first touch position and sensors that need to be disabled may be preset. In this way, after the first touch position is determined, the sensors that need to be disabled may be determined based on the correspondence. It may be understood that when the sensors outside the first preset region are controlled, based on the first touch position of the active pen on the screen of the electronic terminal, to be disabled, the foregoing several possible scenarios are merely used as examples for description in this embodiment of this application, but this does not mean that this embodiment of this application is merely limited thereto.

In this way, after the sensors outside the first preset region are controlled to be disabled based on the first touch position of the active pen on the screen of the electronic terminal, only the sensors in the first preset region are in a working mode. Therefore, when a second touch position of the active pen on the screen of the electronic terminal is subsequently determined, downlink signals sent by the active pen can be collected only by using the sensors in the first preset region, and the second touch position of the active pen on the screen of the electronic terminal is determined based on the downlink signals collected by the sensors in the first preset region. That is, the following S1004 is performed.

S1004: Determine a second touch position of the active pen on the screen of the electronic terminal based on the downlink signals collected by the sensors in the first preset region.

The second touch position may be the same as the first touch position, or may be different from the first touch position, and is a new control position. When the second touch position is the same as the first touch position, it may be understood that the active pen currently stays at the first touch position, and does not move on the screen of the electronic terminal. When the second touch position is different from the first touch position, it may be understood that the active pen moves on the screen of the electronic terminal, and moves from the first touch position to a new touch position, that is, the second touch position.

Only the sensors in the first preset region are in a working mode. Therefore, when the second touch position of the active pen on the screen of the electronic terminal is determined, the second touch position of the active pen on the screen of the electronic terminal is no longer determined based on downlink signals collected by all sensors under the screen. Instead, the second touch position of the active pen on the screen of the electronic terminal is determined only based on the downlink signals collected by the sensors in the first preset region. In this way, a semaphore used to calculate the second touch position is reduced, and efficiency for calculating the second touch position is improved.

It can be learned that, in this embodiment of this application, once a touch position of the active pen on the screen of the electronic terminal is detected, the sensors outside the preset region are controlled to be disabled. In other words, only the sensors in the preset region that includes the touch position are still in a working mode. In this way, when downlink signals sent by the active pen are subsequently collected, the downlink signals are collected only by using the sensors in a working mode, instead of always by using all sensors under the screen of the electronic terminal, so that detection flexibility is improved when a touch position of the active pen on the screen of the electronic terminal is detected.

Figure 17:
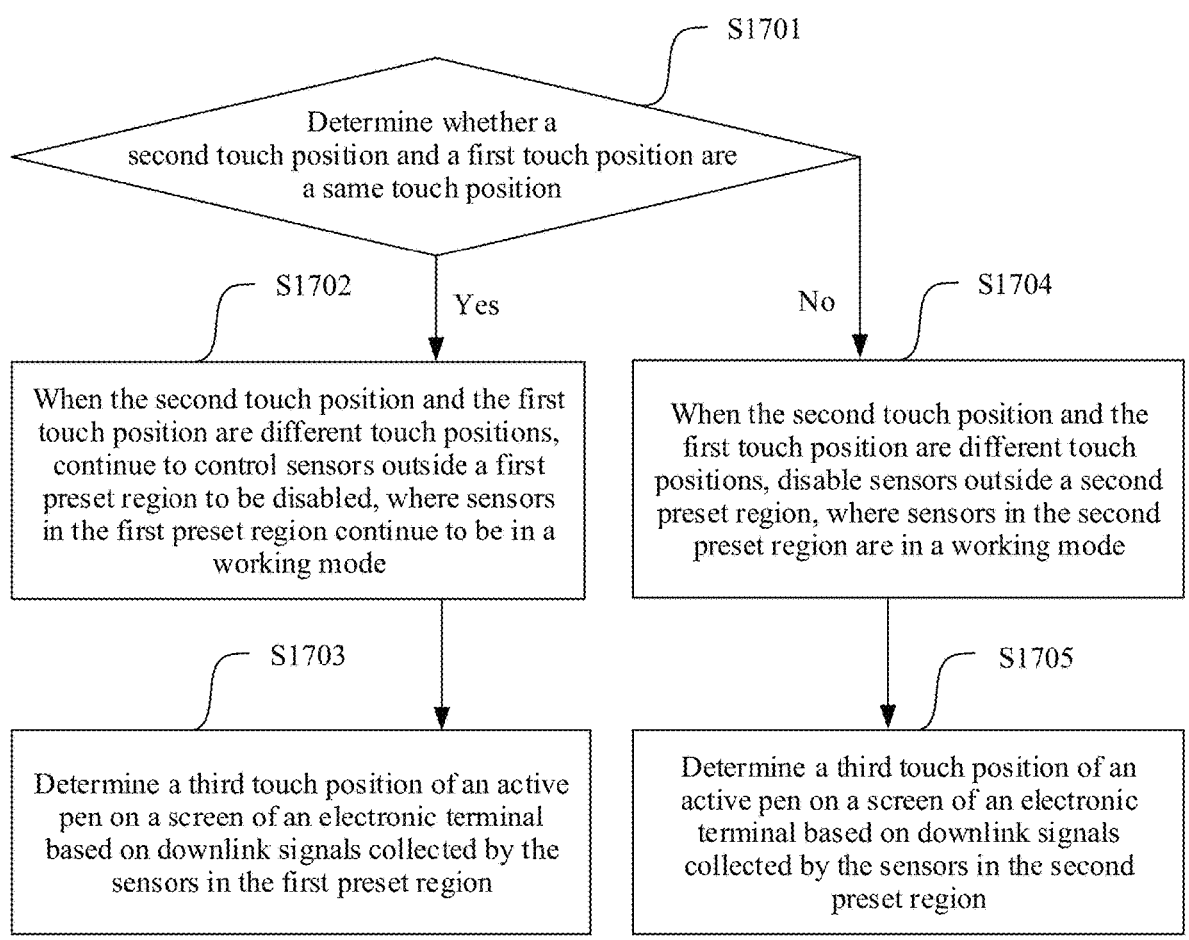
FIG. 17 is a schematic flowchart of still another method for detecting an active pen touch position according to an embodiment of this application.

Based on the embodiment shown in FIG. 3, after the second touch position of the active pen on the screen of the electronic terminal is determined based on the downlink signals collected by the sensors in the first preset region, it may be further determined whether there is a need to control a sensor outside a new preset region to be disabled. For example, FIG. 17 is a schematic flowchart of still another method for detecting an active pen touch position according to an embodiment of this application. The method for detecting a touch position may further include the following steps.

S1701: Determine whether the second touch position and the first touch position are a same touch position.

When the second touch position and the first touch position are a same touch position, the following S1702 and S1703 are performed. On the contrary, when the second touch position and the first touch position are different touch positions, the following S1704 and S1705 are performed.

S1702: When the second touch position and the first touch position are a same touch position, continue to control the sensors outside the first preset region to be disabled, where the sensors in the first preset region continue to be in a working mode.

Figure 18:
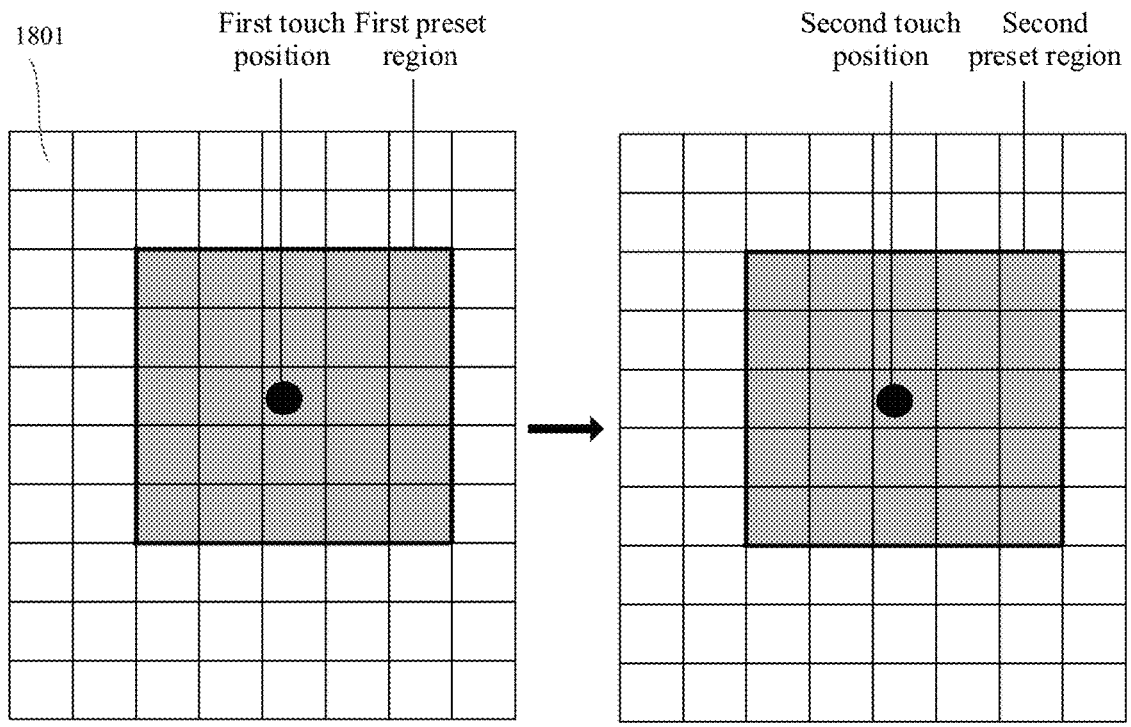
FIG. 18 is a schematic diagram of a second preset region according to an embodiment of this application.

When the second touch position and the first touch position are a same touch position, it may be understood that the active pen currently stays at the first touch position and does not move on the screen of the electronic terminal, and a second preset region corresponding to the second touch position is still the first preset region. For example, FIG. 18 is a schematic diagram of a second preset region, in an array of sensors 1801, according to an embodiment of this application. Because the second preset region is still the first preset region, sensors outside the first preset region may continue to be disabled, and sensors in the first preset region continue to be in a working mode. In this way, only the sensors in the first preset region are still in a working mode. When downlink signals sent by the active pen are subsequently collected, the downlink signals are collected only by using the sensors in the first preset region, and the sensors outside the first preset region are in an off mode and no longer collect the downlink signals. Compared with a conventional technology in which all sensors need to be always in a working mode to collect downlink signals, this reduces power consumption of the electronic terminal.

In this way, after the sensors outside the first preset region continue to be controlled to be disabled, only the sensors in the first preset region are in a working mode. Therefore, when a new third touch position of the active pen on the screen of the electronic terminal is subsequently determined, downlink signals sent by the active pen can be collected only by using the sensors in the first preset region, and the third touch position of the active pen on the screen of the electronic terminal is determined based on the downlink signals collected by the sensors in the first preset region. That is, the following S1703 is performed.

S1703: Determine a third touch position of the active pen on the screen of the electronic terminal based on the downlink signals collected by the sensors in the first preset region.

Only the sensors in the first preset region are in a working mode. Therefore, when the third touch position of the active pen on the screen of the electronic terminal is determined, the third touch position of the active pen on the screen of the electronic terminal is no longer determined based on downlink signals collected by all sensors under the screen. Instead, the third touch position of the active pen on the screen of the electronic terminal is determined only based on the downlink signals collected by the sensors in the first preset region. In this way, a semaphore used to calculate the third touch position is reduced, and a calculation efficiency of the third touch position is improved.

S1704: When the second touch position and the first touch position are different touch positions, disable sensors outside the second preset region, where sensors in the second preset region are in a working mode.

The second touch position is included in the second preset region, and a quantity of sensors in the second preset region is less than a quantity of all sensors under the screen of the electronic terminal.

Figure 19:
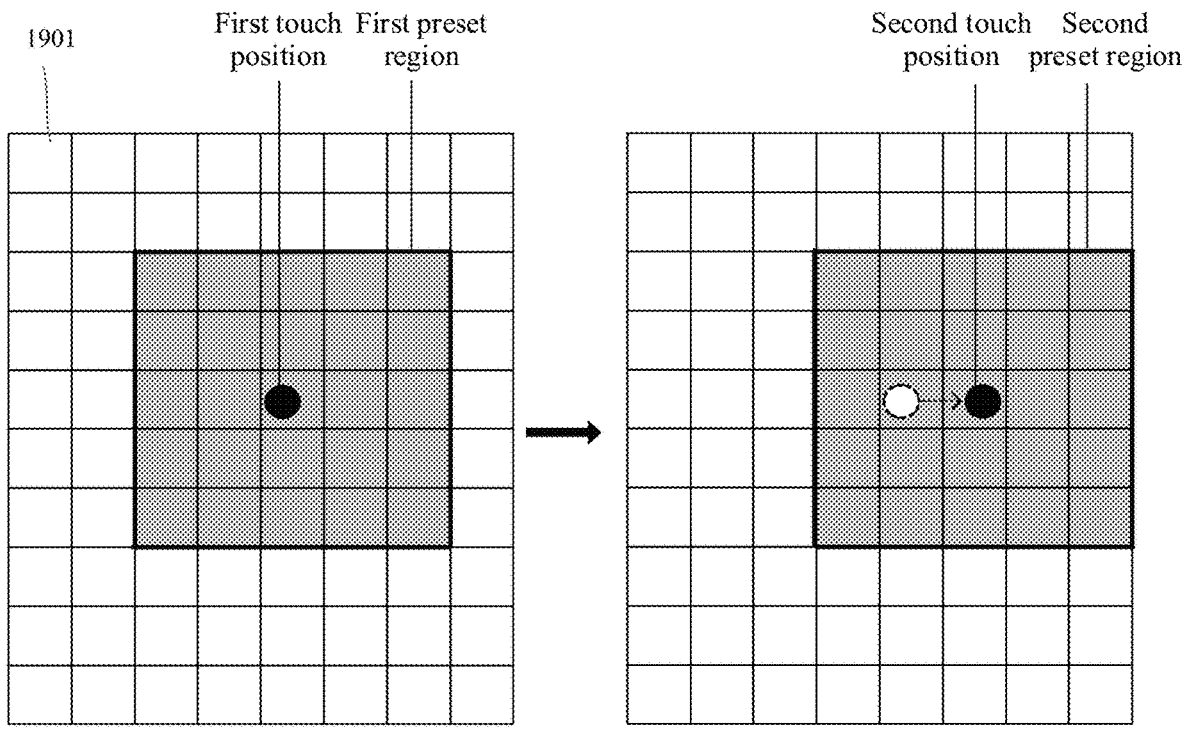
FIG. 19 is another schematic diagram of a second preset region according to an embodiment of this application.

When the second touch position and the first touch position are different touch positions, it may be understood that the active pen moves on the screen of the electronic terminal, and moves from the first touch position to a new second touch position. When the active pen moves to the second touch position, the sensors outside the second preset region are controlled to be disabled. For example, FIG. 19 is another schematic diagram of a second preset region, in an array of sensors 1901, according to an embodiment of this application. In this way, only sensors in the second preset region are still in a working mode. When downlink signals sent by the active pen are subsequently collected, the downlink signals are collected only by using the sensors in the second preset region, and sensors outside the second preset region are in an off mode and no longer collect the downlink signals. Compared with a conventional technology in which all sensors need to be always in a working mode to collect downlink signals, this reduces power consumption of the electronic terminal.

It may be understood that, before the sensors outside the preset region that includes the second touch position are controlled to be disabled, similarly, the second preset region needs to be determined first. When the second preset region is determined, sensors included in the second preset region are further determined, and then the sensors outside the second preset region can be controlled to be disabled. It may be understood that, in this embodiment of this application, a method for determining the second preset region and the sensors included in the second preset region is similar to the foregoing method for determining the first preset region and the sensors included in the first preset region. For details, refer to the foregoing related descriptions of determining the first preset region and the sensors included in the first preset region. Herein, for how to determine the first preset region and the sensors included in the first preset region, this is not described again in this embodiment of this application.

In this way, after the sensors outside the second preset region are controlled to be disabled, only the sensors in the second preset region are in a working mode. Therefore, when a new third touch position of the active pen on the screen of the electronic terminal is subsequently determined, downlink signals sent by the active pen can be collected only by using the sensors in the second preset region, and the third touch position of the active pen on the screen of the electronic terminal is determined based on the downlink signals collected by the sensors in the second preset region. That is, the following S1705 is performed.

S1705: Determine a third touch position of the active pen on the screen of the electronic terminal based on downlink signals collected by the sensors in the second preset region.

Only the sensors in the second preset region are in a working mode. Therefore, when the third touch position of the active pen on the screen of the electronic terminal is determined, the third touch position of the active pen on the screen of the electronic terminal is no longer determined based on downlink signals collected by all sensors under the screen. Instead, the third touch position of the active pen on the screen of the electronic terminal is determined only based on the downlink signals collected by the sensors in the second preset region. In this way, a semaphore used to calculate the third touch position is reduced, and a calculation efficiency of the third touch position is improved.

Based on the embodiment shown in FIG. 3 or FIG. 17, after the active pen completes one drawing operation on the screen of the electronic terminal, the active pen leaves the screen of the electronic terminal. When a touch position of the active pen on the screen of the electronic terminal is detected again, usually, all the sensors under the screen of the electronic terminal may be controlled to be enabled, downlink signals sent by the active pen are collected by using each sensor, and then the touch position of the active pen on the screen of the electronic terminal is determined based on downlink signals collected by each sensor. When the touch position of the active pen on the screen of the electronic terminal is detected, sensors outside a preset region that includes the touch position are controlled to be disabled, and sensors in the preset region are still in a working mode. Certainly, when it may be determined that the active pen continues to perform the drawing operation along the touch position at which a previous drawing operation stops, only sensors that are in the preset region and that surround the touch position at which the previous drawing operation stops may be controlled to be in a working mode, and sensors outside the preset region are controlled to be disabled. The setting may be performed specifically based on an actual requirement.

Figure 20:
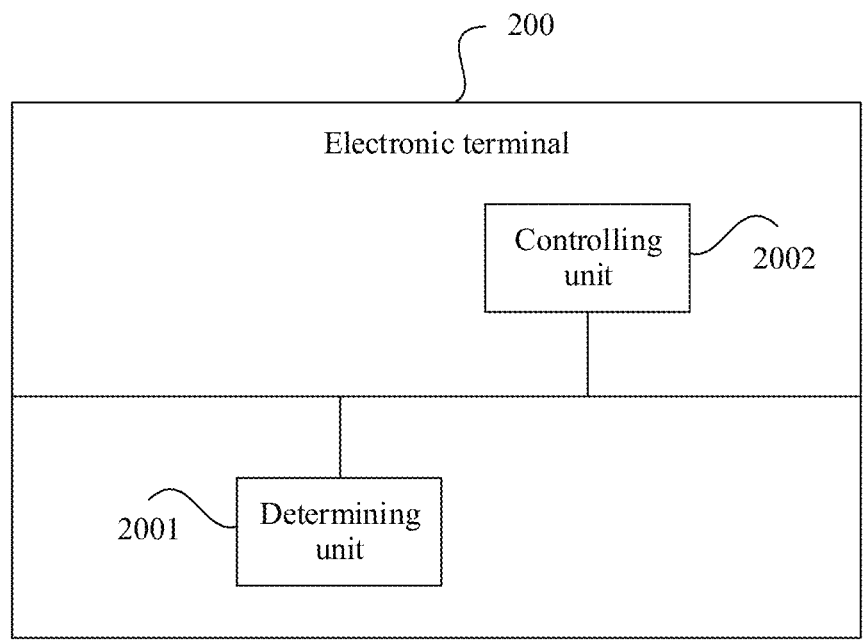
FIG. 20 is a schematic diagram of a structure of an electronic terminal according to an embodiment of this application.

FIG. 20 is a schematic diagram of a structure of an electronic terminal 200 according to an embodiment of this application. For example, as shown in FIG. 20, the electronic terminal 200 may include:

a determining unit 2001, configured to determine a first touch position of an active pen on a screen of the electronic terminal based on downlink signals collected by sensors under the screen of the electronic terminal;

a controlling unit 2002, configured to disable, based on the detected first touch position, sensors outside a first preset region corresponding to the first touch position, where sensors in the first preset region are still in a working mode, the first touch position is included in the first preset region, and a quantity of sensors in the first preset region is less than a quantity of sensors under the screen of the electronic terminal; and the determining unit 2001, further configured to determine a second touch position of the active pen on the screen of the electronic terminal based on downlink signals collected by the sensors in the first preset region.

Optionally, the first touch position is a central point of the first preset region.

Optionally, a shape of the first preset region is a regular pattern.

Optionally, the first preset region is a range that centers on the first touch position and includes M*N sensors surrounding the first touch position, where both M and N are positive integers.

Optionally, the first preset region is a range that centers on the first touch position and whose radius is a length of P sensors, where P is a positive integer.

Optionally, the controlling unit 2002 is further configured to control a first sensor to be in a working mode when the first sensor totally falls in the first preset region.

Optionally, the controlling unit 2002 is further configured to control a second sensor to be in a working mode when the second sensor partially falls in the first preset region.

Optionally, the controlling unit 2002 is further configured to: when an area of the second sensor falling in the first preset region is greater than a preset threshold, control the second sensor to be in a working mode.

Optionally, the determining unit 2001 is further configured to determine whether the second touch position and the first touch position are a same position.

The controlling unit 2002 is further configured to: when the second touch position and the first touch position are different positions, disable sensors outside a second preset region corresponding to the second touch position, where sensors in the second preset region are still in a working mode, the second touch position is included in the second preset region, and a quantity of sensors in the second preset region is less than the quantity of sensors under the screen of the electronic terminal; or when the second touch position and the first touch position are a same position, determine that the second preset region is the first preset region.

Optionally, the controlling unit 2002 is further configured to: control the sensors under the screen of the electronic terminal to be enabled, and control the sensors under the screen of the electronic terminal to send uplink signals to the active pen, where the uplink signals are used to wake up the active pen.

The electronic terminal 200 shown in this embodiment of this application may perform the technical solution of the method for detecting an active pen touch position shown in any one of the foregoing embodiments. An implementation principle and beneficial effects thereof are similar to those of the method for detecting an active pen touch position. Details are not described herein again.

Figure 21:
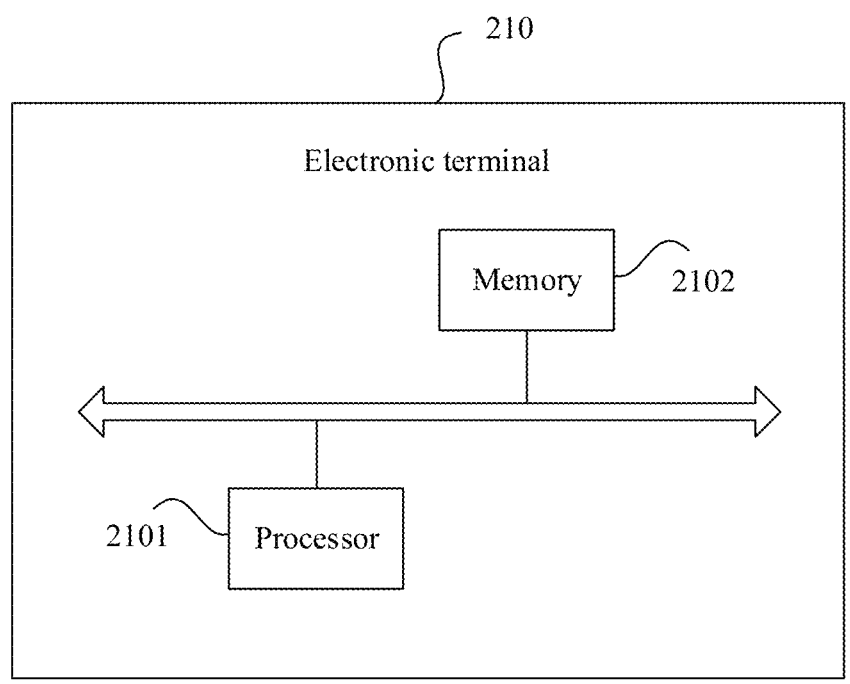
FIG. 21 is a schematic diagram of a structure of another electronic terminal according to an embodiment of this application.

FIG. 21 is a schematic diagram of a structure of another electronic terminal 210 according to an embodiment of this application. For example, as shown in FIG. 21, the electronic terminal 210 includes a processor 2101 and a memory 2102. The memory 2102 stores a computer program. The processor 2101 executes the computer program stored in the memory 2102, so that the electronic terminal 210 is enabled to perform the technical solution of the method for detecting an active pen touch position shown in any one of the foregoing embodiments. An implementation principle and beneficial effects thereof are similar to those of the method for detecting an active pen touch position. Details are not described herein again.

An embodiment of this application further provides an electronic terminal, where the electronic terminal includes a processor and an interface circuit.

The interface circuit is configured to receive code instructions and transmit the code instructions to the processor.

The processor is configured to run the code instructions, to perform the technical solution of the method for detecting an active pen touch position shown in any one of the foregoing embodiments. An implementation principle and beneficial effects thereof are similar to those of the method for detecting an active pen touch position. Details are not described herein again.

An embodiment of this application further provides a chip, where the chip stores a computer program. When the computer program is executed by a processor, the technical solution of the method for detecting an active pen touch position shown in any one of the foregoing embodiments is performed. An implementation principle and beneficial effects thereof are similar to those of the method for detecting an active pen touch position. Details are not described herein again.

An embodiment of this application further provides a readable storage medium, configured to store instructions. When the instructions are executed, the method for detecting an active pen touch position is implemented. An implementation principle and beneficial effects thereof are similar to those of the method for detecting an active pen touch position. Details are not described herein again.

The processor in the foregoing embodiments may be a general-purpose processor, a digital signal processor (digital signal processor, DSP), an application-specific integrated circuit (application specific integrated circuit, ASIC), a field programmable gate array (field programmable gate array, FPGA) or another programmable logic device, a discrete or a transistor logic device, or a discrete hardware component. The processor may implement or perform the methods, the steps, and the logical block diagrams disclosed in embodiments of this application. The general-purpose processor may be a microprocessor, or the processor may be any conventional processor, or the like. Steps of the methods disclosed with reference to embodiments of this application may be directly performed and completed by using a hardware decoding processor, or may be performed and completed by using a combination of hardware and software modules in the decoding processor. The software module may be located in a mature storage medium in the art, such as a random access memory (random access memory, RAM), a flash memory, a read-only memory (read-only memory, ROM), a programmable read-only memory, an electrically erasable programmable memory, or a register. The storage medium is located in the memory, and the processor reads instructions in the memory and completes the steps in the foregoing methods in combination with hardware of the processor.

In several embodiments provided in this application, it should be understood that the disclosed apparatus and method may be implemented in another manner. The described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, that is, may be located in one location, or may be distributed on a plurality of network units. Some or all of the units may be selected based on an actual requirement to achieve the objectives of the solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of hardware plus a software functional unit.

What is claimed is:

1. An electronic terminal, comprising:
   a determining unit, configured to determine a first touch position of an active pen on a screen of the electronic terminal based on downlink signals collected by sensors under the screen of the electronic terminal;
   a controlling unit, configured to disable, based on the determined first touch position, sensors outside a first region corresponding to the first touch position, wherein sensors in the first region are still in a working mode, the first touch position is comprised in the first region, and a quantity of sensors in the first region is less than a quantity of sensors under the screen of the electronic terminal, and wherein when a percent of an area of a second sensor in the first region is greater than a preset threshold the controlling unit is further configured to control the second sensor to be in the working mode; and
   the determining unit, further configured to determine a second touch position of the active pen on the screen of the electronic terminal based on downlink signals collected by the sensors in the first region.

2. The electronic terminal according to claim 1, wherein the first touch position is a central point of the first region.

3. The electronic terminal according to claim 2, wherein a shape of the first region is a regular pattern.

4. The electronic terminal according to claim 1, wherein the first region is a range that centers on the first touch position and comprises M*N sensors surrounding the first touch position, wherein both M and N are positive integers.

5. The electronic terminal according to claim 1, wherein the first region is a range that centers on the first touch position and whose radius is a length of P sensors, wherein P is a positive integer.

6. The electronic terminal according to claim 5, wherein the controlling unit is further configured to control a first sensor to be in a working mode when the first sensor totally is in the first region.

7. The electronic terminal according to claim 1, wherein the determining unit is further configured to determine whether the second touch position and the first touch position are a same position; and
   the controlling unit is further configured to: when the second touch position and the first touch position are different positions, disable sensors outside a second region corresponding to the second touch position, wherein sensors in the second region are still in a working mode, the second touch position is comprised in the second region, and a quantity of sensors in the second region is less than the quantity of sensors under the screen of the electronic terminal; and when the second touch position and the first touch position are a same position, determine that the second region is the first region.

8. The electronic terminal according to claim 1, wherein the controlling unit is further configured to: control the sensors under the screen of the electronic terminal to be enabled, and control the sensors under the screen of the electronic terminal to send uplink signals to the active pen, wherein the uplink signals are used to wake up the active pen.

9. An electronic terminal, wherein the electronic terminal comprises a processor and a memory, the memory stores a computer program, and the processor is configured to execute the computer program stored in the memory, so that the electronic terminal is enabled to perform the following steps:
   determine a first touch position of an active pen on a screen of the electronic terminal based on downlink signals collected by sensors under the screen of the electronic terminal;
   disable, based on the determined first touch position, sensors outside a first region corresponding to the first touch position, wherein sensors in the first region are still in a working mode, the first touch position is comprised in the first region, and a quantity of sensors in the first region is less than a quantity of sensors under the screen of the electronic terminal, and wherein when a percent of an area of a second sensor in the first region is greater than a preset threshold the controlling unit is further configured to control the second sensor to be in the working mode; and
   determine a second touch position of the active pen on the screen of the electronic terminal based on downlink signals collected by the sensors in the first region.

10. The electronic terminal according to claim 9, wherein the first touch position is a central point of the first region.

11. The electronic terminal according to claim 10, wherein
    a shape of the first region is a regular pattern.

12. The electronic terminal according to claim 9, wherein
    the first region is a range that centers on the first touch position and comprises M*N sensors surrounding the first touch position, wherein both M and N are positive integers.

13. The electronic terminal according to claim 9, wherein
    the first region is a range that centers on the first touch position and whose radius is a length of P sensors, wherein P is a positive integer.

14. The electronic terminal according to claim 13, wherein
    the electronic terminal is further enabled to control a first sensor to be in a working mode when the first sensor totally is in the first region.

15. The electronic terminal according to claim 9, wherein the electronic terminal is further enabled to:
    determine whether the second touch position and the first touch position are a same position;
    when the second touch position and the first touch position are different positions, disable sensors outside a second region corresponding to the second touch position, wherein sensors in the second region are still in a working mode, the second touch position is comprised in the second region, and a quantity of sensors in the second region is less than the quantity of sensors under the screen of the electronic terminal; and
    when the second touch position and the first touch position are a same position, determine that the second region is the first region.

16. The electronic terminal according to claim 9, wherein the electronic terminal is further enabled to: control the sensors under the screen of the electronic terminal to be enabled, and control the sensors under the screen of the electronic terminal to send uplink signals to the active pen, wherein the uplink signals are used to wake up the active pen.

\* \* \* \* \*